(12) United States Patent
Brooker et al.

(10) Patent No.: US 6,776,183 B1
(45) Date of Patent: Aug. 17, 2004

(54) AIRCRAFT DRAIN DEVICE

(75) Inventors: Steven Charles Brooker, Hartville, OH (US); Robert William Hyde, Green, OH (US); Martin I. Lei, Canton, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/421,353

(22) Filed: Apr. 23, 2003

Related U.S. Application Data

(60) Provisional application No. 60/451,158, filed on Feb. 28, 2003.

(51) Int. Cl.$^7$ .................................................. E03C 1/12
(52) U.S. Cl. ..................... 137/216; 137/216.1; 137/218; 137/899.2
(58) Field of Search ............................... 137/216, 216.1, 137/216.2, 218, 899.2

(56) References Cited

U.S. PATENT DOCUMENTS

| | | | | |
|---|---|---|---|---|
| 592,690 A | * | 10/1897 | Bragger ................... | 137/216.2 |
| 700,719 A | | 5/1902 | Alien et al. | |
| 1,996,325 A | | 4/1935 | Cox ................ | 4/131 |
| 2,119,328 A | | 5/1938 | Haberlin ........................ | 4/77 |
| 2,565,720 A | | 8/1951 | Collison et al. .............. | 4/131 |
| 2,878,826 A | * | 3/1959 | Dolenga ..................... | 137/216 |
| 3,079,612 A | | 3/1963 | Corliss ............................ | 4/10 |
| 3,183,525 A | | 5/1965 | O'Brien et al. .................... | 4/1 |
| 3,406,951 A | | 10/1968 | Marks ......................... | 261/36 |
| 3,477,699 A | | 11/1969 | Drayer ........................ | 261/36 |
| 3,507,381 A | | 4/1970 | Dewey ............................ | 4/76 |
| 3,535,712 A | | 10/1970 | Zeff et al. ........................ | 4/10 |
| 3,833,943 A | | 9/1974 | Sturtevant ........................ | 4/10 |
| 3,922,730 A | | 12/1975 | Kemper ............................ | 4/10 |
| 3,927,425 A | | 12/1975 | Delaney et al. ................... | 4/10 |
| 3,936,888 A | | 2/1976 | Sturtevant ........................ | 4/10 |
| 3,954,123 A | | 5/1976 | Duckworth, Jr. ............. | 137/800 |
| 3,958,279 A | | 5/1976 | Bogusz ........................... | 4/10 |
| 4,017,395 A | | 4/1977 | Davis ......................... | 210/167 |
| 4,027,701 A | | 6/1977 | Duckworth, Jr. ............. | 137/800 |
| 4,069,521 A | | 1/1978 | Aleman ......................... | 4/300 |
| 4,070,714 A | | 1/1978 | Bishton, Jr. et al. ............. | 4/318 |
| 4,086,670 A | | 5/1978 | Krause et al. ................. | 4/295 |
| 4,202,061 A | | 5/1980 | Waters ......................... | 4/317 |
| 4,275,470 A | | 6/1981 | Badger et al. ................. | 4/316 |
| 4,332,041 A | | 6/1982 | Kristoffersen .................. | 4/316 |
| 4,357,719 A | | 11/1982 | Badger et al. ................. | 4/316 |
| 4,506,851 A | | 3/1985 | Gupta et al. .............. | 244/129.1 |
| 4,646,775 A | * | 3/1987 | Traylor ....................... | 137/216 |
| 4,715,561 A | | 12/1987 | Spinosa et al. .......... | 244/129.1 |
| 5,035,011 A | | 7/1991 | Rozenblatt et al. ............. | 4/665 |
| 5,104,069 A | | 4/1992 | Reising ...................... | 244/136 |
| 5,176,165 A | * | 1/1993 | Traylor ....................... | 137/216 |
| 5,197,515 A | | 3/1993 | Saville et al. ................ | 137/613 |
| 5,232,010 A | | 8/1993 | Rozenblatt et al. ......... | 137/347 |
| 5,290,996 A | | 3/1994 | Giamati et al. ............. | 219/201 |
| 5,305,778 A | * | 4/1994 | Traylor ....................... | 137/216 |
| 5,392,826 A | | 2/1995 | Saville et al. ............... | 137/800 |

(List continued on next page.)

Primary Examiner—Gerald A. Michalsky
(74) Attorney, Agent, or Firm—Renner, Otto, Boisselle & Sklar, LLP

(57) ABSTRACT

An aircraft drain device (14) for interposition between a potable water line (e.g., the drain line from an ice drawer) and a gray water line leading to a drainmast or other external drain. The drain device (14) includes a housing (30), an inlet (36) adapted for connection to the potable water line, an outlet (38) adapted for connection to the gray water line, and a piston (40). The preferably floatable piston (40) is movable between a normal operation position, whereat potable water can flow to the drainmast, and a back-up operation position, whereat the potable water is protected from contact with the gray water. The drain device (14) can be constructed to prevent spillage (or leakage) during back-up operation.

20 Claims, 4 Drawing Sheets

U.S. PATENT DOCUMENTS

| | | | |
|---|---|---|---|
| 5,429,149 A | 7/1995 | Mittell et al. | 137/2 |
| 5,535,784 A | 7/1996 | Saville et al. | 137/800 |
| 5,552,576 A | 9/1996 | Giamati | 219/201 |
| 5,592,964 A * | 1/1997 | Traylor | 137/216 |
| 5,655,732 A | 8/1997 | Frank | 244/1 R |
| 5,769,124 A | 6/1998 | Ehrhardt | 137/625.47 |
| 5,944,985 A * | 8/1999 | Bowman | 210/153 |
| 6,196,274 B1 | 3/2001 | Duncan | 141/1 |
| 6,223,361 B1 | 5/2001 | Rozenblatt | 4/653 |
| 6,367,518 B2 | 4/2002 | Duncan | 141/97 |
| 6,393,635 B2 | 5/2002 | Rozenblatt | 4/653 |
| 6,425,554 B1 | 7/2002 | Moreland | 244/136 |
| 6,435,452 B1 | 8/2002 | Jones | 244/1 A |
| 6,450,254 B1 | 9/2002 | Hoyle et al. | 165/200 |
| 6,463,956 B2 | 10/2002 | Walker | 137/563 |
| 6,536,055 B2 | 3/2003 | Pondelick et al. | 4/431 |
| 6,565,758 B1 | 5/2003 | Thomas | 210/776 |
| 6,571,562 B2 | 6/2003 | Wilcox | 60/779 |
| 6,604,709 B1 | 8/2003 | Wentland et al. | 244/118.5 |

\* cited by examiner

AIRCRAFT DRAIN DEVICE

RELATED APPLICATIONS

This application claims priority under 35 U.S.C. § 119(e) to U.S. Provisional Patent Application No. 60/451,158, which was filed on Feb. 28, 2003. The entire disclosure of this earlier application is hereby incorporated by reference.

FIELD OF THE INVENTION

This invention relates generally, as indicated, to an aircraft drain device and, more particularly, to a drain device for removing water from an ice drawer in an aircraft cabin.

BACKGROUND OF THE INVENTION

Food and drinks are commonly served to passengers and crew while the aircraft is in flight. With particular reference to drinks, and more particularly cold beverages, an aircraft will usually include an ice drawer for supplying ice for the beverage service. An ice drawer typically includes a top compartment containing potable ice and a bottom compartment (e.g., a drain drawer). The compartments are separated by a screen or other porous member to allow water produced by ice melting in the top compartment to drip to the lower compartment. Desirably, a line is provided to drain the melted-ice water from the bottom compartment on a substantially continuous basis to avoid re-freezing and/or leakage.

In an aircraft, draining of liquids is commonly accomplished by directing the waste liquid to a drainmast, whereat the liquid is ejected into the air during flight. Specifically, waste liquids are tapped into a common plumbing line leading to an outlet port on the drainmast. Accordingly, tapping the ice drawer's drain line into the common plumbing line would seem to be the logical way to drain the ice drawer on a continuous basis. However, the waste liquids in the common plumbing line come from sources such as unfinished drinks poured down sinks and/or hand-washing water from the lavatory. Such liquid is commonly called "gray water," in that it is no longer suitable for drinking but is not harmful to discharge into the air during flight.

If the ice drawer's drain line was tapped into a gray water plumbing line leading to the drainmast (or other external drain), there would be a potential problem of gray water contacting previously potable ice. Specifically, in the unlikely event of a back-up, gray water in the plumbing line could back up through the ice drawer's drain line and pass into the compartments of the ice drawer. This is clearly undesirable, as the gray water may not be suitable for drinking and thus should not be contacting ice cubes used to serve beverages. Therefore, if the ice drawer is to drain to the drainmast, a separate plumbing line and a separate ejection (i.e., outlet) port should be provided to assure sanitary conditions.

SUMMARY OF THE INVENTION

The present invention provides an aircraft drain device that can be used to drain an ice drawer to the drainmast (or other external drain) while assuring that gray water cannot enter the ice drawer drain line. In this manner, the ice drawer's drain line can be connected to the common plumbing line leading to the drainmast. A separate plumbing line and/or a separate drainmast ejection port are not necessary to assure sanitary conditions and protection of the potable ice.

More particularly, the present invention provides an aircraft drain device for interposition between a potable water line and a gray water line leading to a drainmast or other external drain. The device comprises a first chamber and a second chamber, an inlet adapted for connection to the potable water line, an outlet adapted for connection to the gray water line and communicating with the second chamber, and a piston. The piston is movable within the housing between a normal operation position and a back-up operation position.

In the normal operation position, the inlet communicates with the first chamber and the first chamber communicates with the second chamber, whereby potable water within the first chamber may flow into the second chamber, through the outlet to the gray water line, and to the drainmast. In the back-up operation position, the first chamber is sealed from the second chamber This inter-chamber isolation prevents gray water in the second chamber from entering the first chamber, thereby protecting the potable water.

Preferably, the first chamber is vented, thereby providing an air gap between the inlet and the second chamber. This can be accomplished by providing openings in the housing so that the first chamber is open to the surrounding air. In any event, providing an air gap between the potable water line and the second chamber (whereat gray water can back up) is an industry-accepted and FDA-approved technique for protecting potable water. In fact, the present invention contemplates any construction defining an air gap, a chamber into which gray water can back up, and a seal between the air gap and the chamber should a back-up occur. It may be noted that the inter-chamber isolation (provided when the piston is in its back-up operation position) prevents grey water within the second chamber from spilling out of the drain device through vent openings.

Preferably, the piston is made of a material that floats in water. In this manner, back-up water in the second chamber will cause the piston to float from the normal operation position to the back-up operation position. To this floatation end, the piston may be made of lightweight material, such as plastic, and have a hollow construction. For example, the piston can be assembled from a cup-shaped component and a corresponding cap-shaped component.

Preferably, the piston, when in the back-up operation position, seals the inlet from the first chamber; whereby potable water in the inlet will not enter the first chamber. This isolates the potable water in an appropriate line. Also, should the first chamber be vented to provide an air gap between the potable water line and the second chamber, this inlet seal prevents leakage of the potable water through any vent openings.

Preferably, the piston seats against an inter-chamber seal to seal the first chamber from the second chamber, and seats against an inlet-surrounding seal to seal the inlet from the first chamber. The seals each may comprise a portion that moves upwardly after contacting the piston and seals therearound at a range of heights after such contact. In this manner, the inlet can be sealed first, followed momentarily by the sealing of the second chamber, or the sealed chamber can be sealed first, followed momentarily by the sealing of the inlet. In other words, precise, simultaneous sealing of the inlet and the chambers is not necessary with the present invention and/or the sealing of one chamber will not prevent the subsequent sealing of the other chamber.

These and other features of the invention are fully described and particularly pointed out in the claims. The following descriptive annexed drawings set forth in detail a certain illustrative embodiment of the invention, this embodiment being indicative of but a few of the various ways in which the principles of the invention may be employed.

DRAWINGS

DETAILED DESCRIPTION

Figure 1:
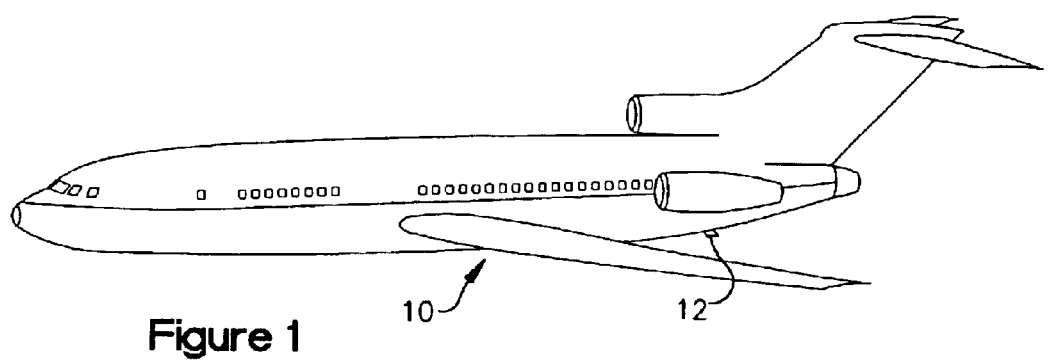
FIG. 1 is a schematic view of an aircraft having a plumbing system which incorporates an aircraft drain device according to the present invention.

Referring now to the drawings in detail, and initially to FIG. 1, an aircraft 10 is schematically shown. The aircraft 10 includes a drainmast 12 (or other external drain) attached to the bottom surface of the aircraft's fuselage for ejection of waste liquids during flight. The drainmast 12 has an ejection port (not specifically shown) with which the waste liquid plumbing lines communicate, and through which the waste liquids are ejected. At least some of the waste liquid in the plumbing lines will constitute "gray water."

Figure 2:
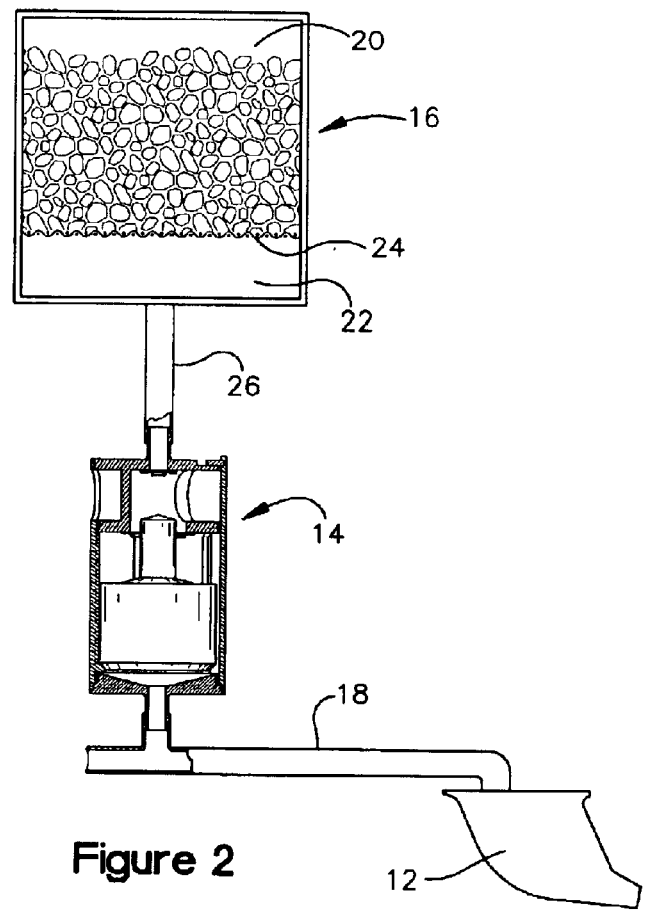
FIG. 2 is a schematic diagram of the plumbing system of the aircraft.

Referring now to FIG. 2, an aircraft drain device 14 according to the present invention is schematically shown in an aircraft plumbing system. The aircraft drain device 14 is interposed between an ice drawer 16, located in the aircraft cabin for beverage-serving purposes, and a gray water plumbing line 18, leading to the ejection port of the drainmast 12. As explained in more detail below, the aircraft drain device 14 assures that gray water in the line 18 cannot enter the ice drawer 16 should the drainmast become plugged and cause a back-up of gray water within the aircraft.

The ice drawer 16 includes a top compartment 20, containing potable ice, and a bottom compartment 22 (e.g., a tray). The compartments 20 and 22 are separated by a screen 24 (or other suitable means) so that water produced by ice melting in the top compartment 20 will drip to the lower compartment 22. A drain line 26 is provided to drain the melted-ice water from the bottom compartment 22 on a substantially continuous basis in order to avoid re-freezing and/or leakage.

Figure 3:
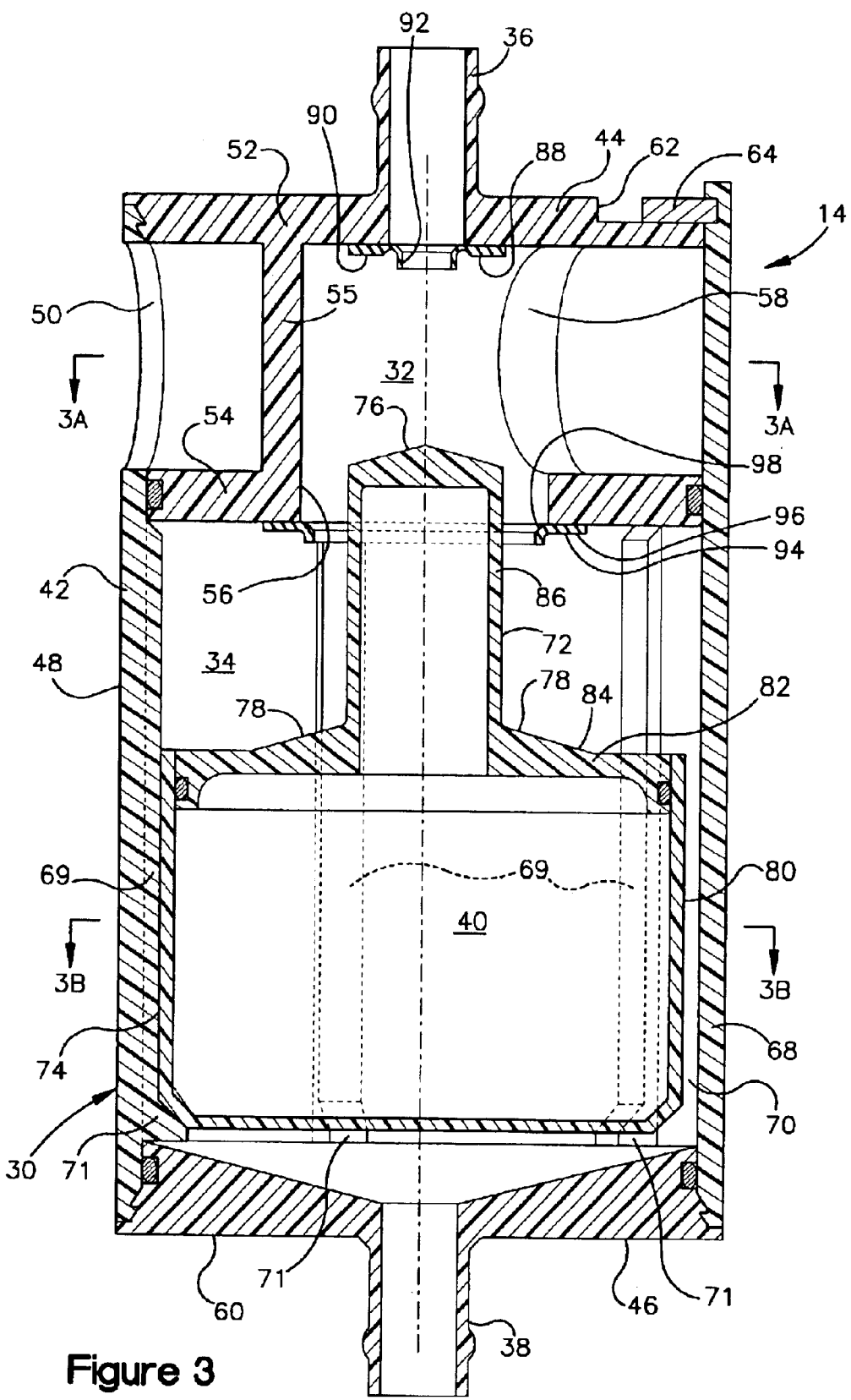
FIG. 3 is a partly side and partly cross-sectional view of the aircraft drain device, the device comprising a housing and a piston which moves therewithin.

Referring now to FIG. 3, the aircraft drain device 14 comprises a housing 30 defining a first chamber 32 and a second chamber 34, an inlet 36, an outlet 38, and a piston 40. The inlet 36 is connected to the ice drawer drain line 26 and communicates with the first chamber 32, and the outlet 38 is connected to the gray water line 18 and communicates with the second chamber 34. The first chamber 32 is vented, thereby providing an air gap between the inlet 36 and the second chamber 34.

The piston 40 is movable within the housing 30 between a normal operation position and a back-up operation position. In the normal operation position, the first chamber 32 communicates with the second chamber 34, whereby potable water may flow through the inlet 36, into the first chamber 32, into the second chamber 34, through the outlet 38 to the gray water line 18, and to the drainmast 12. In the back-up operation position, the first chamber 32 is sealed from the second chamber 34, whereby gray water in the second chamber 34 will be prevented from entering the first chamber 32. The piston 40 is preferably made of a floatable material, whereby the presence of water within the second chamber 34 will cause movement thereof from the normal operation position to the back-up operation position.

The housing 30 can comprise any suitable structure, such as, for example, a single-piece construction or multi-piece construction. In the illustrated embodiment, the housing 30 is assembled from a side component 42, a top component 44, and a bottom component 46. The components 42, 44 and/or 46 (or other components used to construct the housing 30) can be made of any appropriate water-impervious material, and preferably are made of a lightweight material, such as plastic.

Figure 3A:
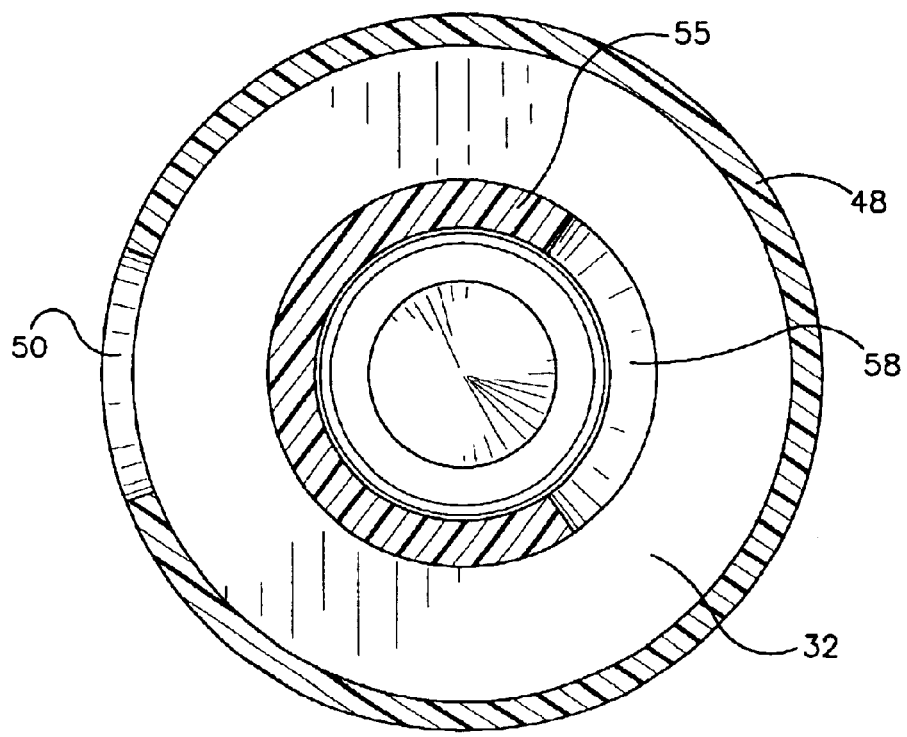
FIG. 3A is a cross-sectional view as taken along line 3A—3A in FIG. 3.

The side component 42 forms the cylindrical side wall 48 of the housing 30 and has one or more vent openings 50. The top component 44 forms the circular upper wall 52 of the housing 30, a circular chamber-dividing wall 54, and a cylindrical wall 55 extending therebetween. The chamber-dividing wall 54 has an opening aligned with the cylindrical wall 55, thereby forming a passageway 56 through the first chamber 32. The cylindrical wall 55 has one or more vent openings 58 which is/are radially mis-aligned with the vent opening(s) 50 in the side component 42. (See FIG. 3A.) The bottom component 46 forms the circular lower wall 60 of the housing 30. The inlet 36 is integrally formed with the top component 44 (and/or the upper wall 52), and the outlet 38 is integrally formed with the bottom component 46 (and/or the lower wall 60).

The upper edges of the side component 42 (and/or the side wall 48) and the upper wall 52 of the top component 44 are constructed to provide a snap-joint therebetween. Additionally or alternatively, a groove 62 can be provided in the upper wall 52 and a snap-ring 64 can be used to secure it to the upper edges of the side component 42. The chamber-dividing wall 54 of the top component 44 is interference-fit within the side component 42 (and/or the side wall 48), and a suitable seal is positioned therebetween. The bottom component 46 is snap-joint fitted within the lower edges of the side component 42 (and/or the side wall 48), and a suitable seal is positioned therebetween.

A sleeve 68 is positioned within the side component 42, beneath the chamber-dividing wall 54 in the second chamber 34. The sleeve 68 can be made of extruded plastic stock, and can be interference-fit within the side component 42 (and/or the side wall 48). That being said, sleeves integral with the housing, or even sleeveless constructions, are possible with and contemplated by the present invention.

Figure 3B:
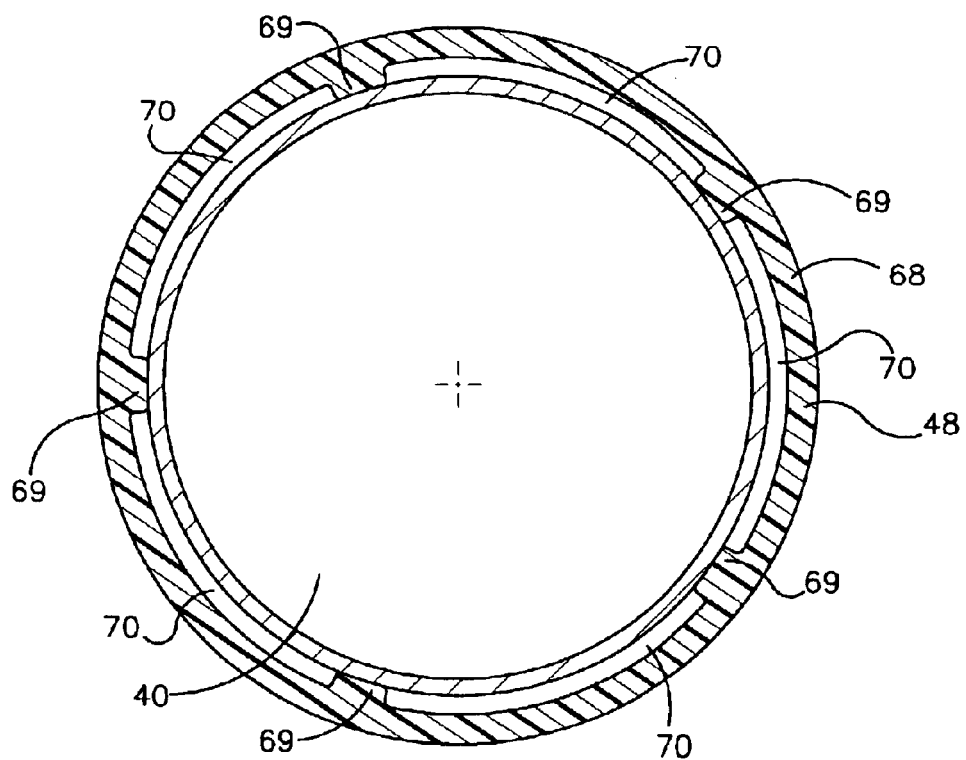
FIG. 3B is a cross-sectional view as taken along line 3B—3B in FIG. 3, with the piston being shown in phantom.

The illustrated sleeve 68 has a generally cylindrical geometry, with one or a plurality of (e.g., five) vanes 69 extending radially inwardly therefrom. The vanes 69 provide guides for the piston 40 within the housing 30, while still providing flow channels 70 therebetween. Piston-resting ramps 71 can be provided at the bottom of the sleeve 68 and can have a sloped upper surface (or other accommodating shape) corresponding to the bottom corner of the piston 40. (See FIG. 3B.) In the illustrated embodiment, the ramps 71 are radially aligned with the vanes 69, as this may facilitate sleeve-manufacturing procedures (e.g., ramp-shaped projections extending the length of the sleeve can be trimmed to form the vanes 69).

The piston 40 comprises an upper narrow portion 72 and a lower wide portion 74. The top end of the upper narrow portion 72 forms a seal-seating surface 76 and, in the illustrated embodiment, this surface 76 has a single-polecircus-tent shape. The top wall of the lower wide portion 74 surrounding (and transitioning into) the upper narrow portion 72 forms another seal-seating surface 78 which, in the illustrated embodiment, has a similar upwardly sloping shape.

In the illustrated embodiment, the piston 40 is constructed from a cup-shaped component 80 and a cap-shaped component 82, having a circular base 84 and a stem 86 extending upwardly therefrom. Preferably, the piston components 80 and 82 are made (e.g., blow molded) from lightweight material and water-impervious material, such as plastic, and more particularly, a synthetic resinous plastic material such as DELRIN®, marketed by E.I. Du Pont De Nemours and Company. Additionally or alternatively, the piston components 80 and 82 preferably have a hollow interior to render the piston 40 floatable in water. However, non-hollow piston components (made of material lighter than water) are possible with and contemplated by the present invention.

The stem 86 of the cap-shaped component 82 forms the upper narrow portion 72 and the seal-seating surface 76. The base 84 of the cap-shaped component 82 and the cup-shaped component 80 form the lower narrow portion 74. The area of the base 84 surrounding and sloping upwardly to the stem 86 forms the seal-seating surface 78. The cap-shaped component 82 (and particularly the circumferential edges of its base 84) is interference fit within the upper edges of the cup-shaped component 80, and a suitable seal is provided therebetween.

A seal 88 is positioned below the housing's upper wall 52 and surrounds the inlet 36. The illustrated seal 88 has an annular mounting base 90 and a crooked tail 92 extending radially inward therefrom. Another seal 94 is positioned below the chamber-dividing wall 54 and surrounds the lower end of the passageway 56. The seal 94 has a construction similar to that of the seal 88; that is, it has an annular mounting base 96 and a crooked tail 98. The seals 88 and 94 can be made from a silicone composition, such as the composition identified as 150GS124 by, and available from, the Goodrich Company.

The base 90 of the seal 88 is attached (e.g., adhesively bonded) to the bottom surface of the upper wall 52. The base 96 of the seal 94 is attached (e.g., adhesively bonded) to the upper surface of the chamber-dividing wall 54. Although not specifically shown in the drawings, the seal-mounting surfaces can be countersunk or otherwise contoured to allow secure attachment and/or bonding of the bases 90 and 96 thereto. In any event, the mounting bases 90/96 remain stationary relative to the housing 30 during operation of the aircraft drain device 14. The tails 92/98 are flexible and hang freely from the respective bases 90/96 so that they may compress and re-orient to accommodate the operational movement of the piston 40. More particularly, the tails 92/98 will move upward after contacting the piston 40 and can form a seal therearound at a range of heights after such contact.

Figure 4:
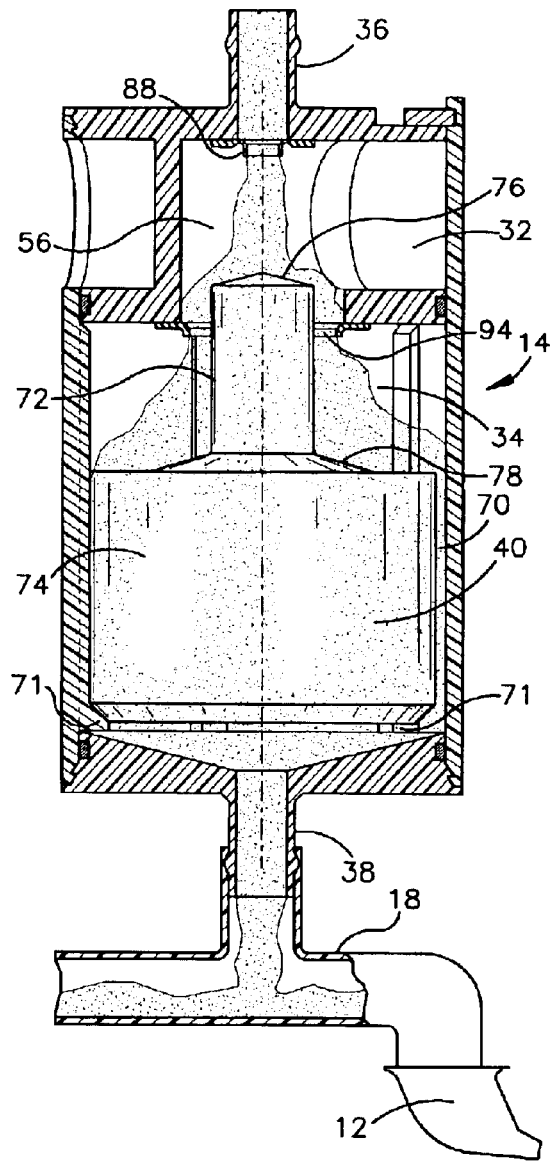
FIG. 4 is a schematic view of the aircraft drain device when the piston is in its normal operation position, whereat the melted-ice water flows to a gray water line leading to the drainmast.
Figure 5:
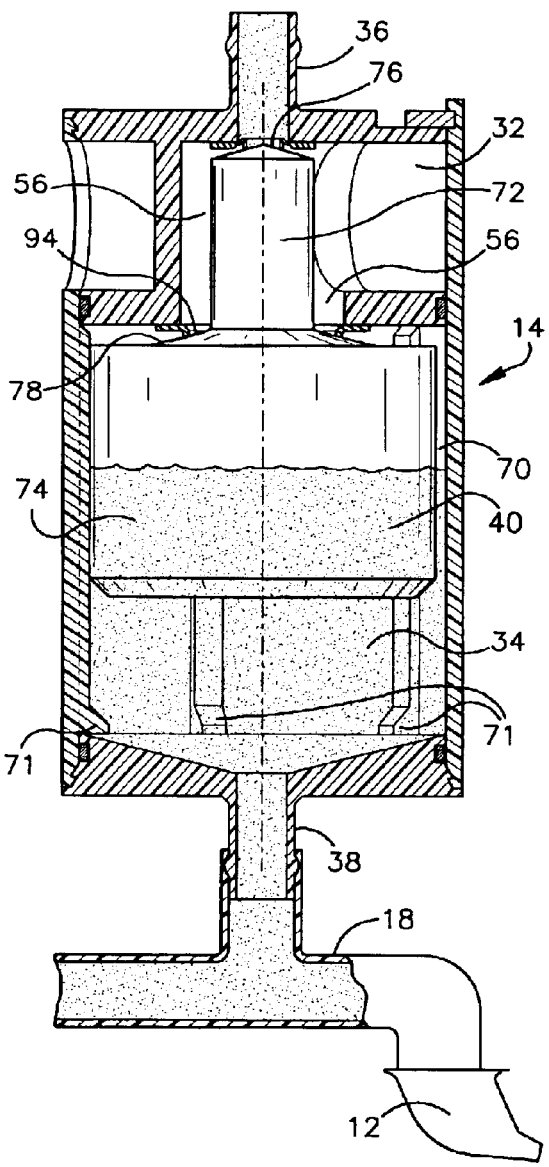
FIG. 5 is a schematic view of the aircraft drain device when the piston is in the back-up operation position, whereat the melted-ice water and the ice drawer drain line are isolated from the gray water line.

Referring now to FIGS. 4 and 5, the operation of the aircraft drain device 14 is schematically shown. During normal operation, the second chamber 34 is relatively empty (i.e., air with perhaps some drops of melted-ice water passing therethrough) and the piston 40 is positioned in its lowermost position. In this normal operation position, the piston's lower wide portion 74 is positioned in the second chamber 34 and rests against the sleeve's ramp projections 71. Most of the piston's upper narrow portion 72 is also positioned within the second chamber 34, with just its upper end extending into the passageway 56. (FIG. 4.)

When the piston 40 is in this normal operation position, the inlet 36 communicates with the first chamber 32 (or air gap) and the passageway 56 is open, whereby the first chamber 32 communicates with the second chamber 34. Melted-ice water drips through the inlet 36, through the first chamber 32 (or air gap), through the flow channels 70.in the second chamber 34, through the outlet 38 to the gray water line 18, and to the drainmast 12. (FIG. 4.) The mis-alignment between the vent opening(s) 50 and the vent opening(s) 58 prevents the water which drops onto the piston end from splashing out of the housing 30. That being said, aligned vent openings 50/58 also could be used without the escape of water in certain designs.

In back-up operation, the gray water fills the second chamber 34 to a predetermined level, and the piston 40 is moved to its uppermost position. In this back-up operation position, the seal-seating surface 76 on the piston's upper narrow portion 72 is seated against the inlet-surrounding seal 88, and the seal-seating surface 78 on the piston's lower wide portion 74 is seated against the passageway-surrounding seal 94. In this manner, the inlet 36 is sealed from the first chamber 32, and the first chamber 32 is sealed from the second chamber 34. Thus, the potable water in the inlet 36 (and the ice drawer 16) remains isolated from the first chamber 32, and the first chamber 32 remains isolated from the gray water in the second chamber 34. (FIG. 5.) This provides an air gap between the potable water and the gray water. Also, this prevents water from spilling out of the drain device 14 through the vent openings 50/58 onto the surrounding area in the aircraft 10.

In the illustrated embodiment, the inlet-surrounding seal 88 and/or the passageway-surrounding seal 94 can accommodate a "two-stage" sealing process. Specifically, the piston-carried seats 76/78 need not reach their respective seals 88/94 precisely simultaneously to ensure the desired isolation of the first chamber 32 (or air gap). More specifically, the flexible tails 92 and 98 allow enough "vertical give" relative to the piston 40 that the inlet 36 can be sealed first, followed momentarily by the sealing of the second chamber 34, or the second chamber 34 can be sealed first, followed momentarily by the sealing of the inlet 36. Accordingly, an "early" seating of one seal 88/94 will not prevent the subsequent seating of the other seal 94/88.

The drain device 14 has been shown and described in connection with the aircraft 10 and, more particularly, to drain the ice drawer 16 on this aircraft. However, other uses on an aircraft are possible with, and contemplated by, the present invention. Moreover, the drain device 14 could find application on non-aircraft vehicles such as a trains, buss, campers, boats, or ships. Although the invention has been shown and described with respect to a certain preferred embodiments, it is evident that equivalent and obvious alterations and modifications will occur to others skilled in the art upon the reading and understanding of this specification. The present invention includes all such alterations and modifications, and is limited only by the scope of the following claims.

What is claimed is:

1. A drain device for interposition between a potable water line and a gray water line leading to an external drain, said device comprising:

a housing defining a first chamber and a second chamber;

an inlet adapted for connection to the potable water line;
an outlet adapted for connection to the gray water line and communicating with the second chamber; and
a piston movable within the housing between:
  a normal operation position, whereat the inlet communicates with the first chamber and the first chamber communicates with the second chamber, whereby potable water within the first chamber may flow into the second chamber, through the outlet to the gray water line and to the external drain; and
  a back-up operation position, whereat the first chamber is sealed from the second chamber, whereby gray water in the second chamber will be prevented from entering the first chamber;
wherein:
the first chamber is vented, thereby providing an air gap between the inlet and the second chamber;
the piston, when in the back-up operation position, seals the inlet from the first chamber, whereby potable water in the inlet will not enter the first chamber; and
back-up water in the second chamber will cause the piston to float from the normal operation position to the back-up operation position.

2. A drain device as set forth in claim 1, wherein the housing comprises a chamber-dividing wall separating the first chamber from the second chamber and includes an opening therebetween, which is sealed when the piston is in its back-up operation position.

3. A drain device as set forth in claim 1, wherein the piston has a hollow interior.

4. A drain device as set forth in claim 3, wherein the piston is assembled from a cup-shaped component and a corresponding cap-shaped component.

5. A drain device as set forth in claim 1, wherein, when the piston in its normal operation position, the potable water passes through flow channels between the housing and the piston as it travels through the second chamber to the outlet.

6. A drain device as set forth in claim 5, further comprising a sleeve positioned between the housing and the piston, and wherein the sleeve at least partially defines the flow channels.

7. A drain device as set forth in claim 6, wherein the sleeve includes resting ramps on which the piston rests when in its normal operation position.

8. A drain device as set forth in claim 1, wherein the piston comprises a narrow portion and a wide portion, and wherein, when the piston is in its back-up operation position, the wide portion has a surface which seats against an inter-chamber seal to seal the first chamber from the second chamber.

9. A drain device as set forth in claim 8, wherein the inter-chamber seal comprises a portion that moves upwardly after contacting the piston and seals therearound at a range of heights after such contact.

10. An aircraft plumbing system comprising the drain device of claim 1, a potable water line, and a gray water line; wherein the inlet is connected to the potable water line and the outlet is connected to the gray water line.

11. An aircraft plumbing system as set forth in claim 10, wherein the potable water line is a drain line from an ice drawer.

12. An aircraft comprising an external drain, a potable water line, a gray water line leading to the external drain, and the drain device of claim 1; wherein the inlet is connected to the potable water line and the outlet is connected to the gray water line.

13. An aircraft as set forth in claim 12, further comprising an ice drawer, and wherein the potable water line is a drain line from the ice drawer.

14. An aircraft as set forth in claim 12, wherein the external drain is a drainmast.

15. In combination, the drain device of claim 1 and a vehicle; wherein the vehicle comprises an external drain, a potable water line, and a gray water line leading to the external drain; and wherein the inlet is connected to the potable water line and the outlet is connected to the gray water line.

16. The combination set forth in claim 15, wherein the vehicle is an aircraft.

17. A drain device for interposition between a potable water line and a gray water line leading to an external drain, said device comprising:
a housing defining a first chamber and a second chamber;
an inlet adapted for connection to the potable water line;
an outlet adapted for connection to the gray water line and communicating with the second chamber; and
a piston movable within the housing between:
  a normal operation position, whereat the inlet communicates with the first chamber and the first chamber communicates with the second chamber, whereby potable water within the first chamber may flow into the second chamber, through the outlet to the gray water line and to the external drain: and
  a back-up operation position, whereat the first chamber is sealed from the second chamber, whereby gray water in the second chamber will be prevented from entering the first chamber;
wherein the piston comprises a narrow portion and a wide portion, and wherein, when the piston is in its back-up operation position, the wide portion has a surface which seats against an inter-chamber seal to seal the first chamber from the second chamber;
wherein the inter-chamber seal comprises a portion that moves upwardly after contacting the piston and seals therearound at a range of heights after such contact; and
wherein, when the piston is in its back-up operation position, the narrow portion has a surface which seats against a seal to seal the inlet from the first chamber, whereby potable water in the inlet will not enter the first chamber.

18. A drain device as set forth in claim 17, wherein the inlet-sealing seal comprises a portion that moves upwardly after contacting the piston and seals therearound at a range of heights after such contact, whereby the inlet can be sealed first, followed momentarily by the sealing of the second chamber, or the second chamber can be sealed first, followed momentarily by the sealing of the inlet.

19. A drain device for interposition between a potable water line and a gray water line leading to an external drain, said device comprising:
a housing defining a first chamber and a second chamber;
an inlet adapted for connection to the potable water line;
an outlet adapted for connection to the gray water line and communicating with the second chamber; and
a piston movable within the housing between:
  a normal operation position, whereat the inlet communicates with the first chamber and the first chamber communicates with the second chamber, whereby potable water within the first chamber may flow into the second chamber, through the outlet to the gray water line and to the external drain; and
  a back-up operation position, whereat the first chamber is sealed from the second chamber, whereby gray water in the second chamber will be prevented from entering the first chamber;

wherein the piston, when in the back-up operation position, seals the inlet from the first chamber, whereby potable water in the inlet will not enter the first chamber, and wherein the inlet can be sealed first, followed by the sealing of the first chamber from the second chamber, or the first chamber can be sealed from the second chamber first, followed by the sealing of the inlet.

20. A method of draining a potable water line to an external drain, said method comprising the steps of:

providing a flow path between the potable water line to a gray water line leading to the external drain, said flow path including an air gap positioned between the potable water line and the gray water line;

sealing the gray water line from the air gap when the gray water line backs up; and sealing the potable water line from the air gap when the gray water line backs up.

\* \* \* \* \*